May 7, 1946.   I. L. PRESSMAN   2,399,824
ADJUSTABLE JIG AND HOLDER
Filed Aug. 9, 1943   5 Sheets-Sheet 1
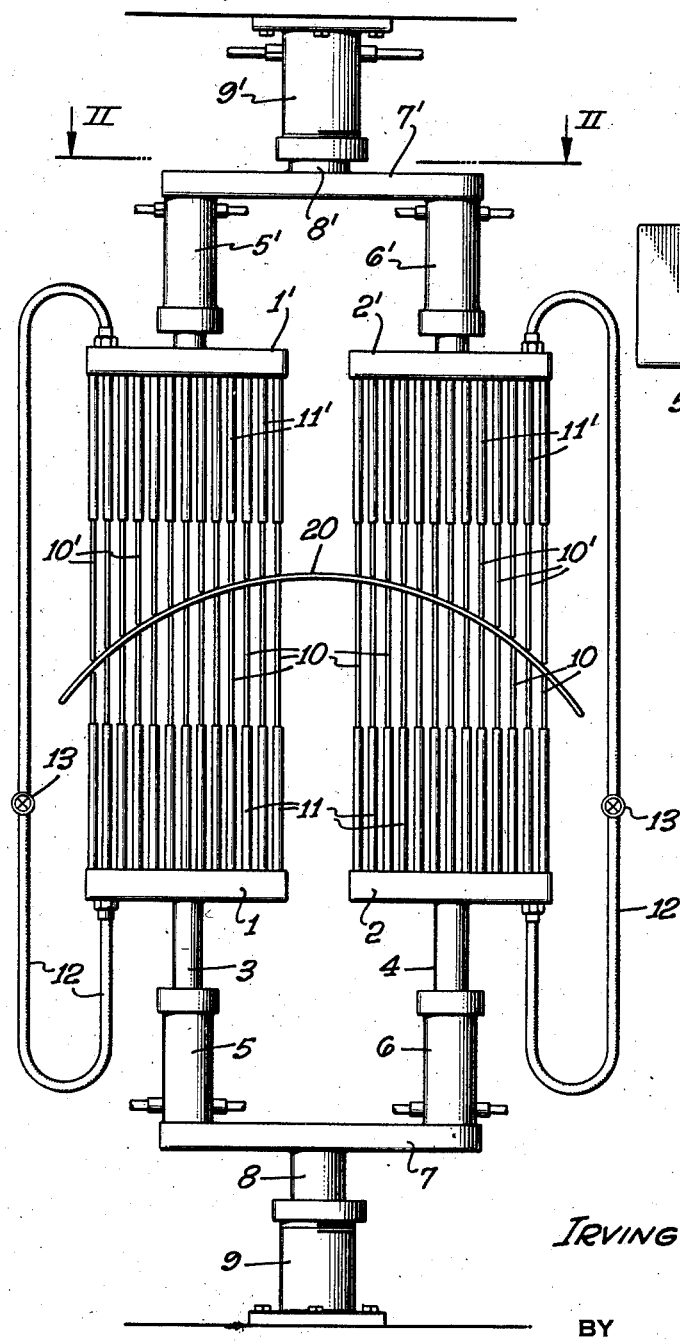
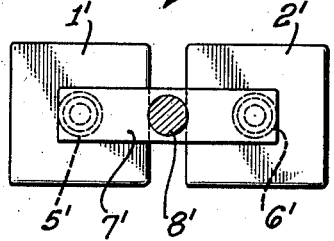
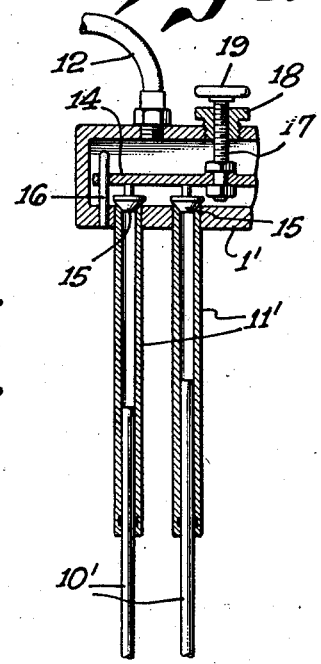
IRVING L. PRESSMAN,
INVENTOR.
BY
ATTORNEY.

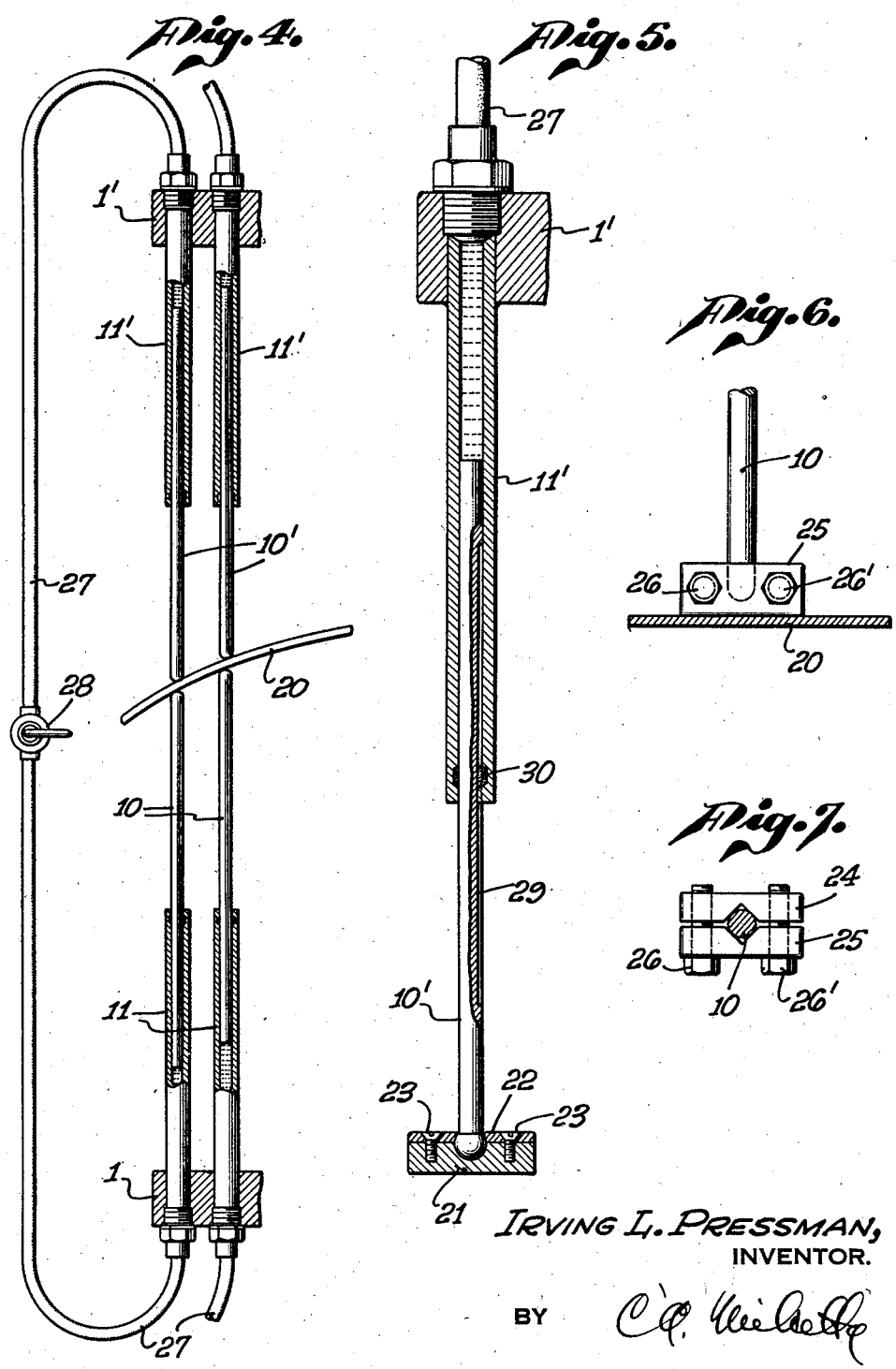

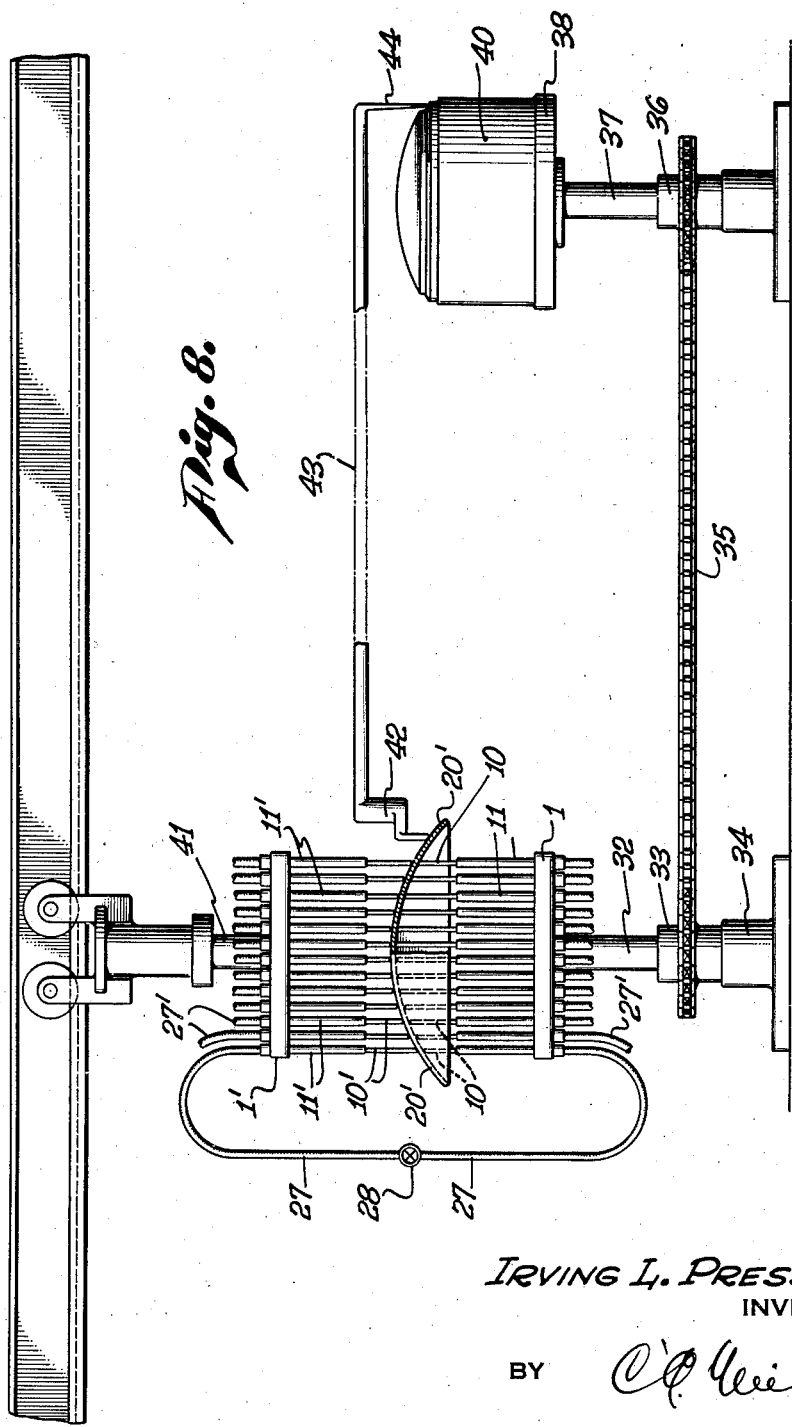

May 7, 1946.  I. L. PRESSMAN  2,399,824
ADJUSTABLE JIG AND HOLDER
Filed Aug. 9, 1943  5 Sheets-Sheet 4
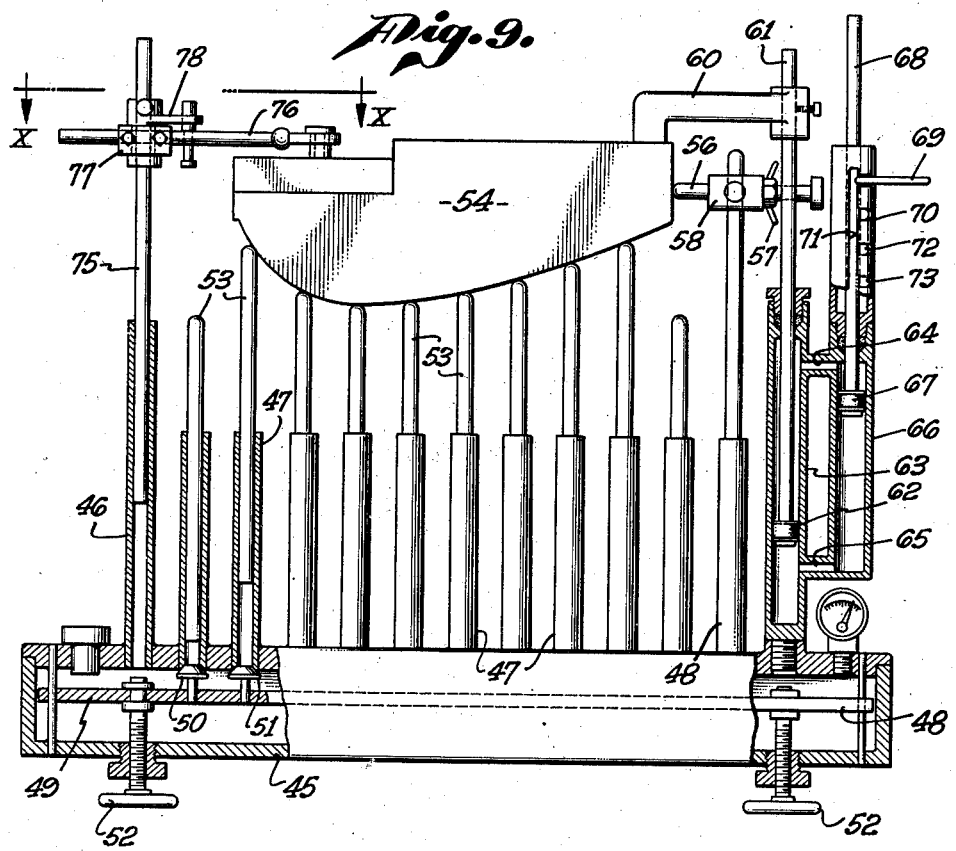
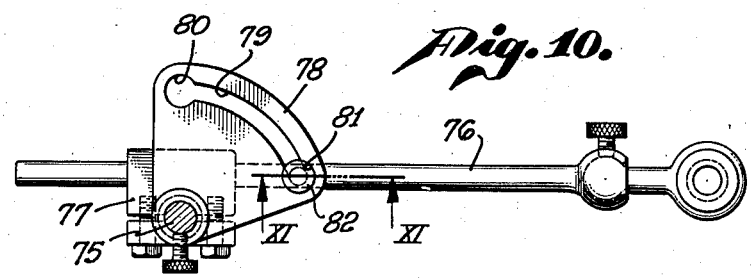
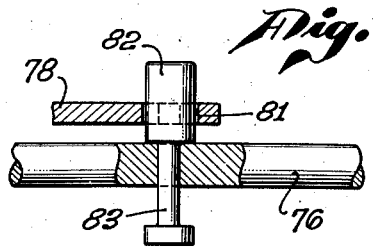
IRVING L. PRESSMAN,
INVENTOR.
BY
ATTORNEY.

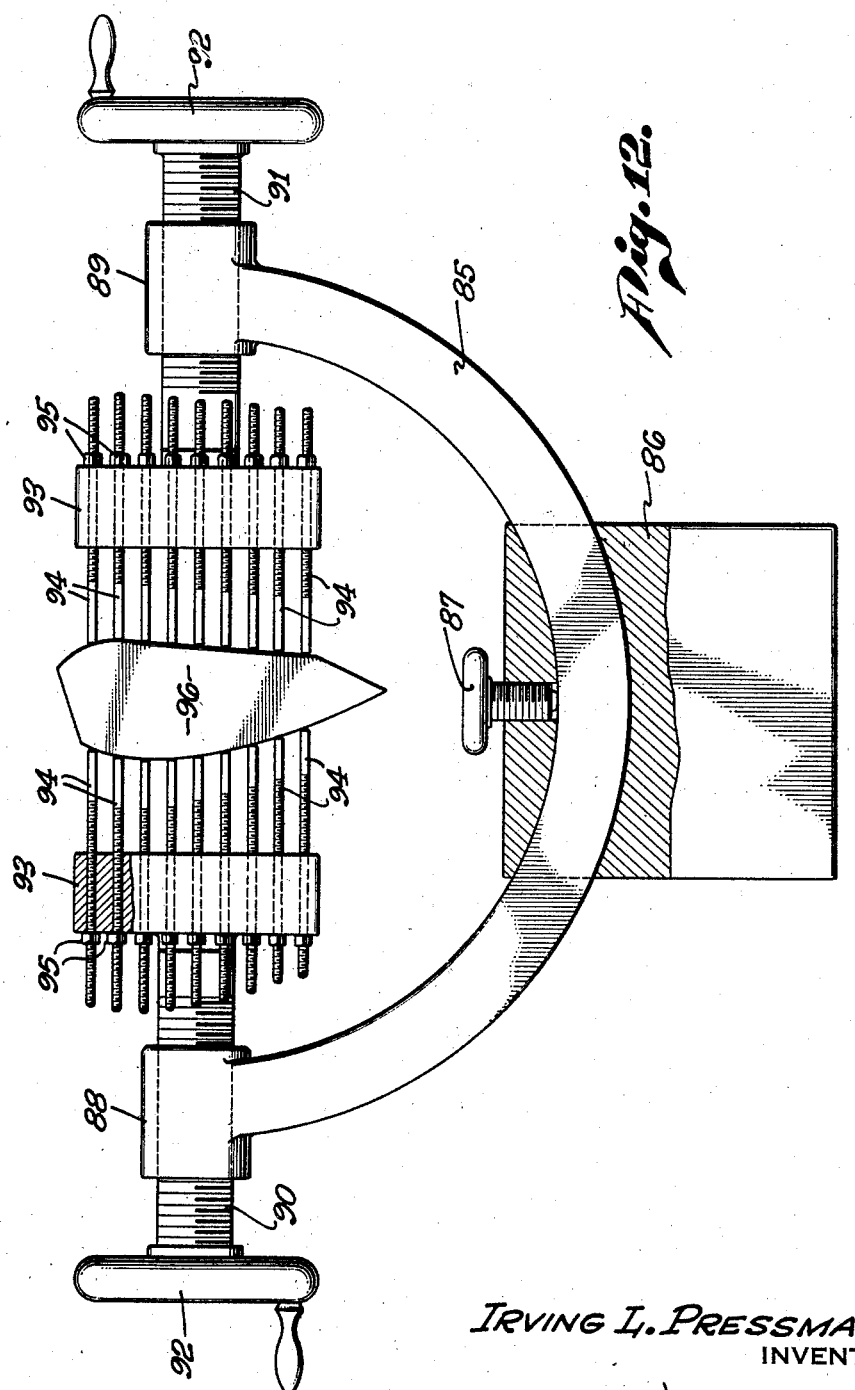

Patented May 7, 1946

2,399,824

UNITED STATES PATENT OFFICE 2,399,824

ADJUSTABLE JIG AND HOLDER

Irving L. Pressman, Los Angeles, Calif.

Application August 9, 1943, Serial No. 497,958

5 Claims. (Cl. 90—59)

This invention pertains to improvements in jigs and other holding devices, these jigs being particularly adapted for use in holding irregularly shaped objects or objects having a varying contour. The invention also pertains to jigs, holders and dies whereby sheet materials may be curved, bent or formed into desired shapes and their contours duplicated by means of routers and other similar devices operating by means of pantographs or universally movable arms from a model, dummy, mockup or the like.

One of the objects of the present invention is to disclose a jig which will conform to any irregular surface and which will maintain the desired seat position so that copies of such irregularly shaped surface may be made or pressed by the jig.

Another object of the invention is to disclose and provide a jig which employs a plurality of substantially parallel holding wheels, the needles being longitudinally adjustable so that their terminal points may be caused to conform to any curved or irregularly shaped surface with which they are brought into contact.

A further object of the invention is to disclose and provide a jig or die which is capable of being used in imparting a desired configuration to pressable or deformable sheet material, the jig or die being capable of adjustment or modification so as to permit its use in the forming of a large variety of objects of different contour.

These and other objects, advantages and adaptations of the invention will become apparent to those skilled in the art from the following description of certain exemplary forms which the present invention may take. In order to facilitate understanding, reference will be had to the appended drawings in which:

Fig. 1 is a side elevation, partly diagrammatic, of one form of press.

Fig. 2 is a horizontal section taken along the plane II—II of Fig. 1.

Fig. 3 is an enlarged view of a portion of the body of one of the universal jigs employed in the device illustrated in Fig. 1.

Fig. 4 is an enlarged view of a modified construction.

Fig. 5 is an enlarged view of a needle and holder, the needle being provided with a pressing head.

Figs. 6 and 7 are a side view and a section respectively, of the lower portion of a holding needle provided with a clamping device.

Fig. 8 is a side view, partly broken away, of a duplicating machine employing the universal jigs of the present invention.

Fig. 9 is a side view (with parts shown in section) showing the use of the holding needles of the present invention in holding an irregularly shaped object for milling or other machining operation.

Fig. 10 is an enlarged section taken along the horizontal plane X—X indicated in Fig. 9.

Fig. 11 is an enlarged section taken along the plane XI—XI of Fig. 10.

Fig. 12 is a plan view, partly in section, of a C-clamp provided with a modified form of holding device.

By referring to Fig. 1, it will be noticed that the lower holding elements comprise body portions 1 and 2 provided with fluid pressure means for raising and lowering the same, such fluid pressure means being generally indicated by the rams 3 and 4 working cylinders 5 and 6 respectively, said cylinders being provided with suitable means for admitting and discharging pressure fluid. The cylinders 5 and 6 may be mounted upon a common base or cross head 7 which may be raised or lowered by means of the ram 8 cooperating with a hydraulic cylinder 9.

Each of the body members 1 and 2 is provided with a plurality of substantially parallel holding needles. In the modification illustrated in Fig. 1, the holding needles are indicated at 10, 10' and the like. Each of the holding needles is slidably retained in a holder or tubular member 11, 11' and the like. The tubular members are firmly carried by the body portions and means are provided for supplying fluid to each of the tubular members so that the needles 10 may be moved within their respective tubular members to any desired position.

In Fig. 1 a body member 1' is positioned in opposing relation to the body member 1 and the various tubular members 11' and their corresponding needles 10' are in virtual axial alignment with the holding needles 10 and the tubular members 11 of the body portion 1. The means for supplying fluid to the body members 1 and 1' may comprise a closed conduit 12 provided with an obturating element or valve 13. As best shown in Fig. 3, each of the body members, such as the body member 1', may be hollow, the tubular members 11' communicating with the interior of the body member 1'. A first body of fluid is thus trapped within the conduit 12, the body members 1 and 1', and the tubular members 11 and 11'. Once the needles 10 and 10' have been moved into a desired position longitudinally of each other, the valve 13 may be closed, the further admission of fluid to each of the tubular members discontinued by any suitable arrangement of valves, thereby locating the needles 10 and 10' in their desired positions. Fig. 3 illustrates a form of valve whereby the admission of fluid to all of the tubular members carried by the body portion 1' may be accomplished simultaneously.

As shown in Fig. 3 a spider 14 may be movably mounted within the hollow body portion 1', the spider portion carrying valves 15 and the like, one of said valves being adapted to be seated upon the end of each of the tubular members 11'. The spider may be guided by means of guide pins 16 extending through suitable ports in the spider 14. An actuating stem 17 threadedly mounted in a gland 18 and provided with a knurled knob or hand wheel 19 is rotatably connected to the spider 14. Manipulation of the knob 19 may be caused to seat or unseat the various valves 15 simultaneously.

When, therefore, the needles 10' have been suitably adjusted in length, the valves 15 may be caused to close the openings between the tubular members 11' and the hollow body portion 1, thereby firmly holding the needles in their desired position.

The upper or opposing body portions 1' and 2' may also be provided with means for raising and lowering the same, such as the hydraulic cylinders 5' and 6', and these in turn may be moved as by means of the crosshead 7' and the hydraulic ram 9'.

In Fig. 1 the opposing pairs of adjustable jigs are shown holding a curved sheet of metal, plastic or the like indicated at 20. The ends of the needles may hold the sheet 20 in position for various machining operations. For example, the body portions 1 and 2 may be horizontally spaced one from the other so as to permit a machining operation to be performed on the curved sheet 20 at some point between the two body portions of the opposing banks of holding needles.

Once the needles have been longitudinally adjusted so as to form to a predetermined curvature or form of object, the entire assembly may be used as a pressing or forming die. The end of each needle may, for example, be provided with a pressing block such as is illustrated in Fig. 5. As there shown, the needle 10 may be provided with a mounting or ball and seated in a suitable semicircular cavity of a press block 21, such press block being movably attached to the end of the needle 10 as by means of a ring 22 and machine screws 23. Figs. 6 and 7 show a modified form of press block, the press block being made of two adjacent sections 24 and 25 held together by means of the bolts 26 and 26', the block portions 24 and 25 forming a clamp about the end of the needle 10. It will be recognized that a universal joint connection exists between block 21 and the needle 10 so that the lower or pressing surface of the block 21 may be at any desired angle with respect to the longitudinal axis of the needle 10.

Whereas the device illustrated in Figs. 1 and 3 discloses a hollow body portion, the various tubular members 11' all communicating with the one hollow body portion and being supplied with fluid therefrom, the modification shown in Figs. 4 and 5 show needle holders 11 and 11' attached to solid body portions 1 and 1' respectively, each pair of opposing tubular members being connected to a common conduit such as the conduit 27 provided with a valve 28. By this arrangement (particularly adapted for use when the object being handled by the jig is of sheet material) the needles 10 and 10' are caused to move in opposite directions and equivalent amounts so that by adjusting the needles carried by the lower body portion 1 so that their tips conform to a desired surface, the band of upper needles 10' is automatically adjusted to conform to the same contour. The valve 28 is open during the adjustment step and as soon as the valve 28 is closed each pair of opposing needles is locked in the adjusted position.

Fig. 5 illustrates on an enlarged scale a needle provided with a small keyway 29, the tubular member 11 being provided with a suitable packing 30 adapted to cooperate with the keyway and at the same time restrain leakage of fluid from the tubular member 11.

Fig. 8 illustrates the adaptation of the universal adjustable jig to a duplicating machine. The lower body portion 1 provided with a plurality of its parallel tubular members 11 and needles 10 may be mounted upon a vertical shaft 32 provided with a sprocket 33, the end of the shaft being mounted in a suitable bearing 34. The sprocket 33 may be driven as by means of a chain 35 and a source of power not shown, the chain 35 also engaging a sprocket 36 carried by shaft 37 on which is mounted the table 38. The table 38 may carry a dummy or mockup 40, whose contours are to be duplicated in the sheet of material 20' carried by the jig. The lower surface of the sheet of material 20' is supported by the holding needles 10. Each of the lower holding needles 10 is opposed by an upper holding needle 10' carried by the tubular member 11' which in turn is mounted in the body portion 1'. Each pair of opposing tubular members 11 and 11' is connected to a common conduit 27, 27' and the like, each conduit being provided with a separate valve 28. The upper body portion 1' may be supported by a ram 41 so that the body portion 1' may be lowered and at the same time revolve if urged to do so by the rotation of the body portion 1. After the sheet material 20' is firmly held between the opposing needles of the jig, the sheet 20' may have its edge portions routed, ground, milled, trimmed, or otherwise worked upon by a tool 42. The tool 42 is actuated by a parallel motion generally indicated at 43 which in turn is actuated by an index member 44 caused to travel over the desired configurations of the dummy 40. The object 40 need not be cylindrical about its vertical axis. Various conduits 27, 27' and the like are preferably made of flexible material so that the entire jig assembly including the object 20' may be rotated slightly more than one revolution at a time, thereby permitting an entire edge area of the object 20' to be worked on.

The form of device shown in Figs. 9, 10 and 11 is particularly adapted for use in holding an object of irregular shape for drill press and milling operations. In this modification, the hollow body portion 45 is provided with a plurality of tubular members 46, 47, 48 and the like, such tubular members being in communication with the chamber within the body portion 45. Means for supplying fluid to such chamber are provided (but not shown). Any suitable form of obturating means for discontinuing communication of the tubular members with the body portion 45 may be supplied, the form illustrated including the spider 49 provided with the valves 50, 51 and the like. The spider 49 is selectively movable by means of the actuating handle 52.

A plurality of parallel axially movable needles such as 53 are adapted to support the object 54. Other needles such as 53 may be provided with horizontally extending contact points 56, the contact points 56 being adjustable in a horizontal direction as by means of a wing nut 57. The contact point 56 may extend through a block 58 carried by the needle 53.

The object 54 may be held by means of arms 60 carried by vertically extending holders 61, the lower ends of such holders 61 being provided with pistons 62 slidable in upstanding tubes 63. The various tubes 63 in which the holders 61 are slidably positioned may be connected as by upper and lower conduits 64 and 65 respectively with a master cylinder 66 provided with a piston 67 carried by the lower end of a rod 68 having a handle 69. A sleeve 70 provided with a vertically extending slot 71 adapted to slidably receive the handle 69 and horizontally extending slots 72, 73 and the like, is mounted upon the upper end of the master cylinder 66. It will be seen that by moving the handle 69 into the slot 71 and depressing the handle downward, movement of the piston 67 is obtained, this causing liquid to move from the master cylinder through conduit 65 into the lower portion of each of the tubular members 63, thereby raising the holding rods 61. Upward movement of the piston 67 within the master cylinder 66 will cause the various holding rods 61 to move downwardly so as to bring the arms 60 into firm pressure contact with the upper surface of the object 54. When the handle 64 has been raised to the maximum position under the circumstances, it is moved horizontally into one of the horizontal slots such as 72 and 73 thereby locating the holding fingers in position.

The tubular member 46 is shown provided with a vertically movable needle 75 provided with a horizontal arm 76 carried by a clamp 77. The needle 75 may also carry a quadrant 78 provided with a slot 79 terminating in enlarged portions 80 and 81. The arm 76 may be used for centering and locating bushings and the like and is located in position in any suitable manner, as for example by means of a pin, best shown in Fig. 11. The pin is provided with an enlarged head 82 adapted to fit into the enlarged portions 80 and 81 of the quadrant. The pin also includes a narrow shank 83 extending through a bore in the arm 76. When the pin is lifted, the narrow shank 83 may be caused to travel through the narrow arcuate slot 79 thereby permitting the arm 76 to be moved into or out of position above the work 54.

A plurality of parallel, individually adjustable holding fingers may also be embodied in other forms of devices such as clamps and will be found to be particularly useful when irregularly contoured, small objects need be handled. In many instances the use of a plastic or soft metal sheet for an irregularly surfaced object can be dispensed with.

For example, in Fig. 12 a C-clamp is shown, this C-clamp including a semicircular member 85 extending through an arcuate slot formed in a tool block holder 86. The position of the arcuate member 85 in the tool holder 86 may be manually adjusted and then locked in position as by means of the set screw 87. Opposing ends of the arcuate member 85 are provided with internally threaded bosses 88 and 89 adapted to receive the bolts 90 and 91 respectively. The outer end of each of the bolts may be provided with a hand wheel or knurled knob 92. The inner end of each of the bolt 90 and 91 may be rotatably connected to a body member. Since the body members are substantially identical the description will be limited to the body member 93 which is rotatably associated with the inner end of the bolt 90. This body member 93 may be provided with a plurality of parallel, internally threaded bores, each of said bores being provided with an externally threaded needle 94 provided with a lock nut 95. These virtually parallel holding needles are adjusted as to length by manipulation of the lock nuts so that their tips contact with the surface of the object 96. The entire body member 93 may then be moved toward and away from the object by actuating the knob 92 so that the C-clamp once set may be rapidly employed in handling objects having a similar contour.

Those skilled in the art will appreciate that numerous changes, modifications and adaptations may be made without departing from the general teachings of this invention. The holding jigs and devices described herein may be used instead of the permanent jigs, dies and forms heretofore employed. The universal jig may be made a part of a machine, bench or drill vice. Several separate pieces or parts may be held in proper relation to each other so as to permit them to be joined, welded or otherwise connected or worked upon. By referring to Fig. 1 it will be readily apparent that the jig composed of body portions 1 and 1', may hold one part and the jig composed of body portions 2 and 2', may hold another part, these parts being then worked upon within the space between such jigs. Various die or core spotting fixtures, contour gauges, bushing holders, hold down or trim forms, etc. may be embodied in the clamping jigs of this invention. The adjustable character of the jigs obviates the necessity of expensive machining and preparation of a separate jig for each article or object upon which work is to be done. The invention is not limited to the specific forms illustrated and described herein and contemplates all changes and modifications coming within the scope of the appended claims.

I claim:

1. In a device of the character described, the combination of: a pair of opposing body portions, each body portion being provided with a plurality of substantially parallel holding needles extending therefrom, the holding needles of one body portion being in virtual axial alignment with the holding needles of the other body portion, means for adjustably positioning each of the holding needles axially thereof, means for moving one of said body portions toward and away from the other, whereby objects of varying contour may be securely held between the ends of opposing needles and means for rotating both of the body portions whereby objects held between the ends of the needles may be rotated to present different edge portions of the objects.

2. In a device of the character described, the combination of: a pair of opposing body portions, each body portion being provided with a plurality of substantially parallel tubular members extending from the body portion; a holding needle slidable in each of the tubular members, the holding needles of one body portion being in virtual axial alignment with the holding needles of the other body portion, a conduit connecting each pair of opposing tubular members, a liquid in each conduit and valve means in each conduit whereby an adjusting movement imparted to one needle of a pair will be translated into a corresponding but opposing adjustment of the opposing needle of such pair.

3. In a clamping device a hydraulic ram, a hydraulic supply line thereto, a hollow body portion mounted on said hydraulic ram, a plurality of tubular members extending from the body portion, a holding needle in each tubular member, a common reservoir of fluid for all said tubular members independent of said hydraulic line, individual valves in operative relation to each tubular member adapted to retain a predetermined amount of fluid in the tubular member and a valve shut-off member common to all said valves.

4. In a clamping device a hydraulic ram, a hollow body portion on the ram, a plurality of tubular members extending from the body portion, a holding needle in each tubular member, the needles being spaced from each other, a common reservoir of fluid for all said tubular members, supply lines from the reservoir to the tubular members and an independent supply of fluid for the hydraulic ram, individual valves mounted in each tubular member and in the supply line therefor adapted to retain a predetermined amount of fluid in the tubular member and a valve actuating means for said valves mounted in the ram.

5. In a clamping device a pair of opposing hydraulic rams, each of said rams being provided with a hollow body portion; a needle holding member carried by each hollow body portion; a plurality of spaced, parallel, axially movable, hydraulic, holding needles in each needle holding member, the needles of one member being in opposing relation to the needles of the other member; a conduit for hydraulic fluid connecting the hollow body portions of said opposing arms; valve means in each hollow body portion, said valve means cooperating with the needle holding member to retain a predetermined amount of fluid in each needle; and means for actuating the valve means in each hollow body portion.

IRVING L. PRESSMAN.